3,493,526
FIREPROOF STRUCTURAL FOAMED PHENOL-
BENZALDEHYDE RESIN CURED WITH
METHYLATED DIPHENYL OXIDE
Harry A. Smith, Midland, Mich., assignor to The Dow Chemical Company, Midland, Mich., a corporation of Delaware
No Drawing. Filed Apr. 10, 1967, Ser. No. 629,409
Int. Cl. C08g 53/10
U.S. Cl. 260—2.5     12 Claims

ABSTRACT OF THE DISCLOSURE

Phenol and benzaldehyde, or a phenol-benzaldehyde resin, dissolved and with blowing agent that can be solvent, is reacted with, e.g., polychloro-methylated diphenyl oxide and heated to obtain a gelled foam which is further heated to cure. Any component can be halogenated but with or without halogen the foam is nonflammable and of excellent structural and insulating properties.

BACKGROUND OF THE INVENTION

Field of the invention

Value has long been recognized in the production as foam of various resinous polymeric substances. Polystyrene foam, though widely used as structural thermal insulation, is flammable unless made self-extinguishing by additives; and melts at relatively low temperatures. Attempts have been made, with varying success, to produce as foams most of the widely used resinous polymers. In general, thermoset polymers have been much harder to foam than thermoplastic polymers. Usually reaction in which a thermoset polymer hardens takes place so slowly that foam collapses before the polymer foam cells harden.

DESCRIPTION OF THE PRIOR ART

Phenol-benzaldehyde resins have gradually crept into the art. Attention is called to U.S. Patents Nos. 2,321,627; 2,504,100; 1,732,368; and 2,894,931. Phenol-benzaldehyde polymers as hitherto known, while of suitable properties for various uses, have not been adapted to produce a foam.

SUMMARY OF THE INVENTION

To the phenol-benzaldehyde resin art, the present invention brings the further contribution of cross-linking with the aid of a substituted diphenyl oxide alkylating agent. The identity of the substituents and their abundance is critical. The substituents upon the diphenyl oxide cross-linking moiety can be halomethyl, methoxymethyl, or hydroxymethyl or a mixture of them. These are the only substituents now known to the inventor by reason of which the crosslinking agent is sufficiently reactive to react to alklylate and effect cross-linking and solidifying of the foam in the relatively short time that is available for reaction during the foaming process and before foam breaks. The relative abundance of such substituent is critical in the sense that at least a cross-linking abundance of them must be present.

As employed, polyhydroxymethylated diphenyl oxide, poly methoxymethylated diphenyl oxide, and polychloromethylated diphenyl oxide or a diphenyl oxide with a mixture of said substituents, act in closely similar manner. When using the first, water of reaction is evolved: when using the second, methanol of reaction is evolved: when using the third, hydrogen chloride of reaction is evolved. Any of these, and especially hydrogen chloride, contributes to the blowing of the foam. When it is inappropriate, in view of an end use, to employ a foam confining small quantities of hydrogen chloride within it, the polychloromethylated starting material will not be preferred. Otherwise, it usually is preferred, because it apparently reacts moderately more quickly to effect the cross-linking of the present invention.

Whatever crosslinking material is supplied to the reaction mixture, there results in the resin product a polymethylene diphenyl oxide cross linking moiety, bonded into the resin structure through the methyl, or strictly, methylene, groups, as alkyl moieties upon the phenol or benzaldehyde aromatic nuclei.

Effective crosslinking properties in the agent require an average of at least two such methylene moieties per diphenyl oxide moiety although their position is not critical. A practical upper limit abundance is about 3.5 substituents per diphenyl oxide moiety, although up to 4 or 5 can be present. Within the range of from 2 to 3.5 such substituents, good foams are readily produced, and they manifest and retain desirable properties. It is not necessary that the crosslinking agent be a pure chemical entity. The introduction, in known manners, of an average number of chloromethyl, hydroxymethyl or methoxymethyl substituents, as controlled by mole ratio of supplied reactants, leads to satisfactory crosslinking agent.

The amount of crosslinking agent to be employed can vary, and the amount, for convenience usually expressed in percent of all components, will affect the properties of the resulting foam.

When too little is used, the cross-linking reaction that makes foam formation possible takes place so slowly that foam collapse sometimes intervenes; or if less blowing agent is used, so that inflation of the foam is not great enough to collapse, then the foam is of bulk density greater than is necessary for strength, or desired.

In contrast, when relative amount of cross-linking agent is excessive, for a combination of reasons a poor foam is obtained. Above certain limits, the displacement of the phenol and benzaldehyde, or the resin produced from them as precursor to this invention, which are essential components of the resin, alters the properties disadvantageously. Moreover, in excessive abundance, the cross-linking agent effects crosslinking and increase of viscosity and resinification of the polymer so rapidly that the blowing agent cannot produce a good foam.

It will be apparent, then, that exact amounts to be employed are to be varied according to choice of blowing agent, amount of blowing agent, and properties desired in the resulting foam.

Below about 8 percent by weight of total foaming mixture or above about 40 percent by weight of total mixture, amounts of crosslinker tend to be so high or so low as to give foams that are unsatisfactory for most uses. Within this range, considerable variation can occur, but with various blowing agents, about 30 percent cross-linking agent by weight of total mixture has given results judged best. With other blowing agents, about 40 percent cross-linking agent appears best.

The exact amount of cross linking agent to be employed is made somewhat less critical by the use of a catalyst to accelerate the cross-linking alkylation reaction. In general, any Lewis acid is useful as a catalyst. Available Lewis acid catalysts that can be used include, in addition to the common proton donor acids, aluminum chloride, sulfur trioxide, stannic chloride, boron trifluoride, zinc chloride, and silver nitrate. Good results have been obtained when using zinc chloride, and it is preferred.

As is usually true with catalysts, the employed amount can vary considerably. However, again, if too little is used, the gelling of the polymer walls of the foam is slow and employed amounts of cross linking agent tend to become critical. If too much is used, it is to some extent wasted, and the cross linking reaction may occur before the foam has achieved its most desirable form. Again, simple range-finding tests will be preferred in testing an individual system. Amounts of zinc chloride on the order of one percent by weight of total foam mixture have given good results; amounts from 0.1 to about 3 percent are usually satisfactory.

Employed proportions of phenol and benzaldehyde are susceptible of considerable variation. The most preferred ratio is an equimolecular ratio, that is, approximately 94 parts phenol to each 106 parts benzaldehyde, both by weight. However, phenol reactant can be employed in excess, and unreacted portion of it, if any, later removed, as by steam distillation. Employment of aldehyde in an amount more than equimolecular with phenol compound is not advisable; use of aldehyde in more than minor excess amount results in formation of an infusible, insoluble resin not applicable in this invention.

When phenol-benzaldehyde resin is employed as a starting material, it is to be understood to be a generally linear resin that is not substantially cross-linked; that is thermoplastic and, in general, solvent-soluble without reaction.

In particular, cross-linked, thermoset, insoluble resins are not applicable as starting materials herein.

The ease with which a foam can be formed, and the properties of the resulting foam, can oftentimes be improved by rendering the starting mixture more fluid. When it is desired to do so without adding further inert solvent or blowing agent solvent, phenol can be added. The present cross-linking agents react readily with phenol and incorporate it into the resulting polymer readily; yet prior to the alkylation reaction, phenol tends to render the entire mixture more readily fluid. When employing phenol and benzaldehyde, a moderate excess of phenol can be used. When employing a pre-formed phenol-benzaldehyde resin, phenol can be melted into the reaction mixture. Desirably, dry phenol is employed.

The foams prepared according to this invention do not support flame to the combustion of the resin walls of the foam cells. In a representative test, a billet 0.25 inch square in section and four inches long is cut from a continuous foam mass, ignoring whether in cutting it foam cell walls are cut. The billet is supported by one end in a horizontal orientation, and a flame is applied to the other end. So long as the flame is held impinging upon the foam, it chars, decomposes, yields pyrolysis products of undetermined chemical identity but of characteristic odor. At once when flame is removed, decomposition stops as the foam cools: there is no ember and no flame.

However, if desired, the resin is readily prepared from ring chlorinated or brominated starting materials. Chlorinated or brominated phenol is of substantially reduced reactivity and is not preferred: or, if used, is to be prepared as a precursor resin with benzaldehyde before going further in this invention. Chlorinated or brominated benzaldehyde is used with good results, and a chlorinated or brominated diphenyl oxide can be used. In any event, chlorine or bromine content must be low enough that reactive, that is to say, unhalogenated, sites remain for the resinification of the product of this invention.

Within these limits, it is convenient to chlorinate to such extent that, in the resulting resin, each phenyl ring residue bears from 0.5 to about 2, both inclusive and average, chloro substituents, or from 0.15 to about 2, both inclusive and average, bromo substituents.

Preparation of the phenol-benzaldehyde precursor resin can take place prior to the formation of foam of this invention, or not, as desired. When previously prepared, amounts of catalyst remaining in the resin may suffice to catalyze the alkylation cross-linking reaction which makes possible the foam formation of this invention. Again, simple range-finding tests, such as analysis of precursor resin for catalyst concentration, or attempting preparation of a test foam relying on the precursor resin catalyst usually suffice.

Foams in considerable variety are readily prepared by choice of blowing agent. In general, blowing agents are those known in the foaming art. However, time/temperature relationships between evolution and pressure of vapor of, or gas evolved by, the blowing agent and cure of the resin by crosslinking tend to be critical. In general, a blowing agent must affect the desired maximum expansion of a foam during about the same interval of time as is required for an initial crosslink reaction of the polymer to take place, to at least a firm gel stage, from which spontaneous collapse of the foam will not occur, and from which, with further heating, a fully cured and heavily crosslinked resin is formed.

In view of the variety of combinations of resin constituents, blowing agent range-finding tests will be in order for any given intended foam composition.

Blowing agents are of three general types and any of them can be employed here. One type is such chemical entity as decomposes or otherwise reacts, to produce gas as product of reaction. Ammonium carbonate is representative. Upon heating, as blowing agent, ammonium carbonate yields abundant gas of decomposition.

A second type is the vaporizable liquid, and dichloromethane, butyl chloride, dimethyl formamide, and light petroleum fractions are representative. In common with vaporization of liquids, generally, these act only after they have been supplied with heat up to the amount of their heat of vaporization. Thereby, they tend to impoverish the resin reaction mixture of content of energy available for crosslinking reaction, and additional heat is required for good foaming.

A third type is the releasably confined, or introduced, gas, and neopentane confined within polymethyl methacrylate microspheres is representative. Gas can also be sparged in.

When a reactive gas source is used, or a gas confined withing e.g. microspheres, blowing agent is not solvent for the resin mixture, and other solvent or solubilizing reactant will be required.

When a flammable blowing agent is employed, portions of it tend to be trapped within the closed cells of the foam of this invention, and can sometimes be ignited, if later released. The polymer remains nonflammable.

Choice of a blowing agent will be made with a view to other factors, such as concentrations and natures of the starting materials, properties desired, and so on. Once again, in any particular system, simple range-finding preparations are desirable. Representatively, the blowing agents here preferred, ranked in general in order inverse to typically available foam density, assuming amounts to be adjustable to optimum in any individual system, are neopentane confined in polymethyl methacrylate microspheres, ammonium carbonate, dichloromethane, chloroform, n-butyl chloride, dimethylformamide, bromobenzene, and toluene.

Amount of blowing agent can vary widely. When used as a solvent, an amount substantially in excess of that needed for blowing is employed. In such situation, the hardening reaction of the resin system, not the exhaustion of blowing agent, limits the foam expansion.

When employing either encapsulated gas or reactive gas-forming substance, it will usually be preferred to add only so much as will achieve the desired foam density.

When employed solely as blowing agent, good results have been obtained by use of dimethyl formamide in amounts equal to, respectively 38, 28, 15, and 5 percent by weight of foaming composition weighed just prior to blowing. When employing the indicated microspheres, it was noted that 40 weight percent of the sum of weights of microspheres and contents was gaseous neopentane. Amounts of total spheres and contents equal to, respectivly, 18.5 to 16.5 weight percent of foaming composition weighed just before blowing have given good results. Commonly, hexanol has been used as solvent for resin, as it is not readily solvent for the polymethyl methacrylate walls of the microspheres. When using dichloromethane, good results have been achieved, with significant differences in resulting foams, when employing amounts equal to, respectively, 47.4; 38.2; 35.1; 29.2; and 26.5 weight percent of foaming composition weighed just before blowing. Foams of higher density were produced when employing the largest and smallest amounts indicated. Ammonium carbonate in amount equal to about 25–30 weight percent of foaming composition has given good results.

It is well known in the resin foam art to include various additives in the polymer mixture, before or during formation of the foam and they can be added here. Such additives include coloring agents, fillers, ultraviolet absorbers, and the like.

It is well known in the resin foam art to produce a foam within a mold, with subsequent hardening of the foam resin, and the process is available here; when employed, the foam takes the shape of the interior of the mold, permanently. These are matters peripheral to the present invention and will lie in reach of those skilled in the art.

It is known to modify cell properties, such as size and wall thickness by addition to the foam-forming mixture of a material which, in the indicated system, is a surfactant, increasing tendency of cells to burst, larger ones more than smaller ones, with more uniform cell size as result. Whether such agent is used here will depend upon desired foam properties, but good results have been obtained when employing a small amount of a glycol-methylpolysiloxane copolymer of viscosity about 1,000 centipoises. Also good results have been obtained from the use of polydimethyl siloxane oils.

The present foam preparation can be carried out in small scale in laboratory glassware, as by combining the reactants and mixing them in a beaker, or test tube or the like, and heating. The same method is available for industrial production.

When production at a higher rate or in larger quantities is desired, it can be accomplished in various ways. In one way, blowing agent is used as a solvent for diphenyl oxide cross-linking compound, or for phenol-benzaldehyde resin (or mixture of phenol and benzaldehyde) together with catalyst or other additive or for both; the separate solvent dispersions are brought together in a common duct and the resulting mixture heated therein as the mixture is about to issue from an orifice, nozzle, or the like. The heated, completed mixture can be directed into a heated mold or the like, to form a gel foam, which is thereafter further heated to bring about complete cure.

In other methods, blowing agent is introduced into the reactant mixture at about the same time as the combining of the reactants is completed. Other industrial adaptations will lie within reach of those skilled in the art.

It is apparent that, within limits, the present invention admits of great variety. The following is a detailed description of several preferred embodiments.

DESCRIPTION OF PREFERRED EMBODIMENTS

Example 1

A mixture is prepared of 27.9 grams (0.263 gram-mole) benzaldehyde and 24.8 grams (0.263 gram-mole) phenol, and to it is added 32.7 grams polychloromethyl diphenyl oxide having an average of slightly more than 2 chloromethyl groups per diphenyl oxide nucleus, the latter material dissolved in 14.6 grams dimethyl formamide. The resulting mixture is gently warmed and stirred, and to it is added one gram finely powdered zinc chloride as catalyst. Preparation to this point is carried out in a one-liter beaker.

The resulting clear, almost colorless liquid is then promptyl heated to 153° C., and maintained thereat, with gentle ebullition of the dimethyl formamide. The liquid produces a foam of which the walls are a fluid of rapidly increasing viscosity as it first rises above the level of continuous liquid, but which rapidly becomes a firm cell-wall solid as the evolution of further foam pushes the foam earlier formed farther from the liquid level.

The resulting firm, non-tackey, non-collapsing foam is then placed, within its beaker, in an oven, and heated for two hours at 150° to cure.

Upon completion of the cure it is removed, cooled to approximately room temperature and examined. It is found to have undergone a volume increase of 800 percent of the original liquid volume, to be of a density of 9.1 pounds per cubic foot: to consist of entire, substantially non-interconnected cells. It is hard and firm, does not crush readily under pressure. A sample removed from it when heated directly in a laboratory gas burner flame, smokes and emits fumes but maintains no ember and there is no flame after the gas burner flame is removed.

Example 2

Twenty-seven and five tenths grams are taken, of an equimolecular phenol-benzaldehyde resin, in a one-liter beaker, and to it are added 26.8 grams of a polychloromethyl diphenyl oxide having an axerage of slightly more than 2 chloromethyl groups per diphenyl oxide nucleus, the latter material dissolved in 37.8 grams dimethyl formamide. One gram finely powered zinc chloride is mixed and stirred into the resulting mixture, and 7.9 grams phenol is added.

The resulting mixture is heated, with stirring, to 153° C., whereupon ebullition begins, and a foam is formed, rising as a fast-setting at first fluid material above the liquid level in the beaker. Eventually, the entire mass of continuous fluid is consumed, and converted to a foam. The foam quickly sets, and does not collapse.

In the beaker in which it is prepared, it is placed in an oven and held for 120 mniutes at 150° C. to cure.

Upon the completion of the cure, it is removed from the curing oven and cooled to room temperature and examined. It closely resembles the foam of Example 1 but has a density of 6.8 pounds per cubic foot and represents a volume 1,000 percent of the volume of the original liquid.

Example 3

In a 3-liter beaker is taken 28.4 grams of an equimolecular condensation resin of phenol and benzaldehyde. To it is added 8.2 grams phenol and 0.9 gram of an ethylene glycol-methylpolysiloxane copolymer cell-control (anti-foam) agent. Residual zinc chloride catalyst in the phenol-benzaldehyde resin is relied upon. A second solution is prepared of 27.8 grams of polychloromethylated diphenyl oxide having an average of slightly more than 2 chloromethyl groups per diphenyl oxide nucleus, in 34.7 grams dichloromethane.

The second solution is mixed into the combnied resin ingredients earlier stated, and mixing is carried on to obtain a homogeneous room-temperature solution. The resulting mixture is then heated to 40° C., whereupon active ebullition takes place, and the mixture very rapidly foams, changing from a viscous liquid, as it occupies the form of foam cell walls, to a firm but tender solid, as it rises. Eventually the entire mass of liquid disappears, becoming foam. The foam is then placed in an oven at 150° C. and maintained thereat for 2 hours to cure. Upon completion of cure, the foam is cooled to room temperature and examined. The 3 liter beaker is nearly full; the foam occupies 2900 percent of the volume of the unfoamed original liquid and has a density of 2.7 pounds per cubic foot. The cells are quite uniform, and of small to moderate size. The cured foam does not crumble readily upon impact, abrasion, or scratching; withstands applied weight well; and does not support a flame or ember, upon application and removal of external flame. It shows no tendency to "punk," i.e., it shows no tendency to be consumed, by the gradual spread of incandescent, but flameless combustion.

Example 4

In a 3-liter flask are placed, together, 31.8 grams of a resin, the reaction product of equimolecular amounts of phenol and benzaldehyde, as a fine, white powder; 9.1 grams phenol, and 1 gram of an ethylene glycol-methylpolysiloxane copolymer cell-control (anti-foam) agent. Zinc chloride remaining in the resin is assumed to suffice for catalysis of the further reaction of this invention.

Separately, 27.1 grams ammonium carbonate in a small, undetermined amount of ethanol, are added to 31 grams of polymethoxymethylated, diphenyl oxide having an average total of moderately more than 2 methoxymethyl groups per diphenyl oxide nucleus. The two mixtures are combined, and stirred thoroughly together. The resulting mixture is heated to a temperature between 58 and 60° C. as upper limit. Foaming ensues promptly; the entire liquid mass is converted to a foam that does not collapse. In the beaker in which it is prepared, it is oven-cured at 150° C. for two hours, cooled, and examined. The volume is 2800 percent of the volume of starting liquid; the foam has a density of 2.7 pounds per cubic foot. The cells are small, not interconnected, of quite uniform size. The foam is rigid, strong, not readily friable. It does not support ember or flame.

Example 5

In a large beaker are combined 26.8 grams of a finely powdered resin, the product of condensation of equimolecular amounts of phenol and benzaldehyde; 12 grams phenol; 40.8 grams polyhydroxymethylated diphenyl oxide having an average of moderately more than 2 hydroxymethyl groups per diphenyl oxide nucleus; 20.4 grams microspheres having polymethyl methacrylate walls and interior contents of neopentane equal to 40 weight percent of total of cell wall and contents. A small, undetermined amount of n-hexanol is added to facilitate liquefaction of the mixture. The mixture is stirred to render it essentially homogeneous; the microspheres retain their identity.

The resulting mixture is then heated, and over the temperature range of 95–105° C., foaming begins. It is not known whether the microspheres melt, or burst, either with escape of gas, or only soften and expand. The formation and appearance of foam do not appear to differ from those formed with other blowing agents. The foam is oven cured at 150° C. for two hours, cooled, and examined. It is found to be a firm, strong, durable foam, of density of 2.5 pounds per cubic foot, and of volume 2100 percent of that of the original liquid from which it is prepared.

A laboratory burner flame is brought to play upon a small portion of the foam. There ensues a very vigorous flame, which burns for a few seconds, and then disappears. The foam is examined and found to be undamaged, showing no evidence of charring, of embers, or of pyrolysis or melting. The cells appear to remain interconnected, their walls entire.

The experiment is repeated, with essentially identical results. It appears that the neopentane blowing agent, or portions of it, persist in some kind of association with the resin as the resin takes the form of, and is cured in the form of foam cells. The observed flame appears to represent the combustion of the neopentane; its extinction appears to represent the exhaustion of the neopentane. The phenomenon has not been observed to change the foam in any observable way except to deprive it of its contents of neopentane. It is believed that other flammable, volatile blowing agents might behave in the same, or similar way.

Example 6

The present example is carried out substantially as were the examples, foregoing. Of the precursor phenol-benzaldehyde resin, 73.6 grams were employed, with 26.4 grams polychloromethylated diphenyl oxide, and, as blowing agent, 37.6 grams bromobenzene. No other substances were employed. Foaming occurred when the mixture was heated to 156° C., the boiling temperature of bromobenzene.

The cured foam was found to have a density of 6.5 pounds per cubic foot, and to represent an increase of 800 percent in volume over the liquid from which it was prepared. The foam was strong, tough, did not support flame or ember.

Example 7

The present example is carried out as were those foregoing; 36.0 grams phenol-benzaldehyde resin are combined with 26.4 grams dichloromethylated diphenyl oxide. As blowing agent, of which 37.6 grams are employed, a mixture of dimethyl formamide and butyl chloride is used. The mixture is placed in an oven at 120–150° C., and, as temperature of the mixture rises, it foams. The cured foam is found to represent an increase of 1,000 percent over volume of original liquid; and to weigh 9.7 pounds per cubic foot.

The polyglycol-polymethylsiloxane material used in cell-size control in this invention is substantially that set forth in Canadian Patent 669,881, Examples 2 and 10, with hydroxyl chain terminations. Other such agents can be used, or such material omitted.

Neopentane, used herein as blowing agent in microspheres, is synonymous with 2,2-dimethylpropane and tetramethyl methane.

I claim:
1. A cured foam that is
solid,
infusible,
insoluble,
of less than 12 pounds weight per cubic foot,
of predominantly non-interconnected cells, that will not propagate flame to consume itself, the walls of the cells of which are composed essentially of a phenol-benzaldehyde-polymethylenediphenyl oxide Lewis acid catalyzed resin.

2. Foam of claim 1 in which the polyalkylenediphenyl oxide moiety is supplied to a resin forming reaction mixture as diphenyl oxide chloromethylated to the extent of from 2 to 3.5, both inclusive and average, chloromethyl groups per diphenyloxide moiety: and the chloromethylated diphenyl oxide is supplied in the amount of from 25 to 40 percent by weight of the sum of the weights of resin components.

3. Foam of claim 1 in which the polymethylenediphenyl oxide moiety is supplied to a resin-forming reaction mixture as diphenyloxide methoxy methylated to the extent of from 2 to 3.5, both inclusive and average, methoxymethyl groups per diphenyloxide moiety: and the methoxy-methylated diphenyloxide is supplied in the amount of from 25 to 40 percent by weight of the sum of the weights of resin components.

4. Foam of claim 1 in which the polymethylenediphenyl oxide moiety is supplied to a resin-forming reaction mixture as diphenyloxide hydroxy methylated to the extent of from 2 to 3.5, both inclusive and average, hydroxy methyl groups per diphenyloxide moiety: and the hydroxy-methylated diphenyloxide is supplied in the amount of from 25 to 40 percent by weight of the sum of the weights of resin components.

5. Foam of claim 1 in which the phenol is a chlorophenol having from 0.5 to 1 chloro moieties, average, per molecule.

6. Foam of claim 1 in which the phenol is a bromopheinol having from 0.15 to 1.0, average, bromo substituents per ring.

7. Foam of claim 1 in which at least one of the phenol, benzaldehyde, and methylenediphenyl oxide is ring chlorinated, the total ring-attached chlorine being from 0.5 to 3.0, average, chloro substituents per ring.

8. Foam of claim 1 in which at least one of the phenol, benzaldehyde, and methylenediphenyl oxide is ring brominated, the total ring-attached bromine being from 0.15 to 1.0, average, bromo substituents per ring.

9. Process of producing a cured polymer foam that is solid, infusible, insoluble, of foam 2.5 to 12 pounds per cubic foot, of predominantly non-interconnected cells, the polymer substance of which will not propagate flame to consume itself and that is composed essentially of a phenol-benzaldehyde-polymethylenediphenyl oxide Lewis acid catalyzed resin which comprises the steps of:
   (1) combining approximately equimolecular amounts of phenol and benzaldehyde together with a cross-linking amount of polychloromethylated diphenyl oxide, polymethoxy methylated diphenyl oxide, or polyhydroxy methylated diphenyl oxide, the chloromethyl, methoxymethyl, or hydroxymethyl groups being present as substituents upon the diphenyloxide in the amount of from 2 to 3.5 both inclusive and average, such groups per diphenyl oxide moiety and with a catalytic amount of a Lewis acid catalyst in a solvent that is normally liquid and has a boiling temperature between 20° C. and 160° C. and is inert with respect to resin components here dissolved in it; and
   (2) intimately mixing and stirring the resulting mixture; and
   (3) thereafter heating the resulting mixture to a temperature of at least about the boiling temperature of the said solvent, whereby a firm, resisting, stable, gelled foam is obtained; and
   (4) heating the resulting foam to a curing temperature.

10. Process of producing a cured foam that is solid, infusible, insoluble, of from 2.5 to 12 pounds per cubic foot, of predominantly non-interconnected cells, the polymer substance of which will not propagate flame to consume itself, that is composed essentially of a phenol-benzaldehyde-polymethylenediphenyl oxide Lewis acid catalyzed resin, which comprises the steps of:
   (1) dispersing in a solvent that is inert to the resin components herein dissolved in it and that boils at a temperature between 20° and 160° C., a soluble, fusible phenol-benzaldehyde resin,
   (2) dispersing in the resulting solution a cross-linking amount of a polychloro methylated diphenyl oxide, a polymethoxy methylated diphenyl oxide, or a polyhydroxy methylated diphenyl oxide, the average number of chloromethyl, methoxymethyl, or hydroxymethyl ring substituents being from 2 to 3.5, both inclusive, per ring,
   (3) there being present in the resulting mixture a catalytic amount of a Lewis acid catalyst introduced as a component of the phenol benzaldehyde resin or added independently,
   (4) and thereafter heating the resulting mixture to the boiling temperature of the said solvent wherein a firm gelled foam is produced, and
   (5) thereafter heating the gelled foam at a curing temperature.

11. Process of producing a cured polymer foam that is solid, infusible, insoluble, of from 2.5 to 12 pounds per cubic foot, of predominantly non-interconnected cells, the polymer substance of which will not propagate flame to consume itself and that is composed essentially of a phenol-benzaldehyde-polymethylenediphenyl oxide Lewis acid catalyzed resin which comprises the steps of:
   (1) dispersing approximately equimolecular amounts of phenol and benzaldehyde together with a catalytic amount of a Lewis acid catalyst in liquid that is an inert solvent selective for phenol, benzaldehyde, a phenol-benzaldehyde acid catalyzed resole resin, diphenyl oxide that has been chloromethylated, hydroxymethylated, or methoxymethylated, but not a solvent for a polymer that is thermoplastic and forms microspheres that enclose a blowing agent, said selective solvent having a boiling temperature between 20° C. and 160° C. and being inert with respect to resin components here dissolved in it;
   (2) adding thereto a form forming quantity of microspheres containing blowing agent confined within substantially spherical walls of polymer insoluble in said selective solvent but melting at a temperature lower then boiling temperature of said selective solvent; and
   (3) adding thereto a cross-linking amount of polychloromethylated diphenyl oxide, polymethoxymethylated diphenyl oxide, or polyhydroxymethylated diphenyl oxide, the chloromethyl, methoxymethyl, or hydroxymethyl groups being present as substituents upon the diphenyl-oxide in the amount of from 2 to 3.5 both inclusive and average, such groups per diphenyl oxide moiety; and
   (4) intimately mixing and stirring the resulting mixture; and
   (5) thereafter heating the resulting mixture to at least the fusion temperature of the said microsphere wall polymer, whereby a firm, resisting stable, gelled foam is obtained; and
   (6) thereafter heating the resulting foam to a curing temperature.

12. Process of producing a cured polymer foam that is solid, infusible, insoluble, of from 2.5 to 12 pounds per cubic foot, of predominantly non-interconnected cells, the polymer substance of which will not propagate flame to consume itself and that is composed essentially of a phenol-benzaldehyde-polymethylenediphenyl oxide Lewis acid catalyzed resin which comprises the steps of:
   (1) dispersing a soluble, fusible, phenol-benzaldehyde resin in liquid that is an inert selective solvent therefor and for diphenyl oxide that has been chloromethylated, hydroxymethylated, or methoxymethylated, but is not a solvent for a polymer that is thermoplastic and forms microspheres that enclose a blowing agent; said selective solvent having a boiling temperature between 20° C. and 160° C. and being inert with respect to resin components here dissolved in it;
   (2) adding thereto a foam forming quantity of microspheres containing blowing agent confined within substantially spherical walls of polymer insoluble in said selective solvent but melting at a temperature lower than boiling temperature of said selective solvent; and
   (3) adding thereto a cross-linking amount of polychloromethylated diphenyl oxide, polymethoxymethylated diphenyl oxide, or polyhydroxymethylated diphenyl oxide, the chloromethyl, methoxymethyl, or hydroxymethyl groups being present as substituents upon the diphenyloxide in the amount of from 2 to 3.5 both inclusive and average, such groups per diphenyl oxide moiety; and
   (4) intimately mixing and stirring the resulting mixture; and
   (5) thereafter heating the resulting mixture to at least the fusion temperature of the said microsphere wall polymer, whereby a firm, resisting, stable, gelled foam is obtained; and (6) thereafter heating the resulting foam to a curing temperature.

References Cited

UNITED STATES PATENTS

| | | | |
|---|---|---|---|
| 2,797,201 | 6/1957 | Veatch et al. | 260—2.5 |
| 2,806,509 | 9/1957 | Bozzacco et al. | 260—2.5 |
| 2,959,508 | 11/1960 | Graham et al. | 260—2.5 |
| 3,298,973 | 1/1967 | Quarles et al. | 260—2.5 |
| 3,316,140 | 4/1967 | Sonnabend | 260—52 |
| 3,317,473 | 5/1967 | Ploeger et al. | 260—55 |

MURRAY TILLMAN, Primary Examiner

K. E. KUFFNER, Assistant Examiner

U.S. Cl. X.R.

260—52, 55